United States Patent [19]

Yamamoto et al.

[11] Patent Number: 4,572,642
[45] Date of Patent: Feb. 25, 1986

[54] AUTOMATIC FOCUSING DEVICE

[75] Inventors: Hiroshi Yamamoto, Kanagawa; Toshikazu Ichiyanagi, Tokyo, both of Japan

[73] Assignee: Canon Kabushiki Kaisha, Tokyo, Japan

[21] Appl. No.: 723,668

[22] Filed: Apr. 16, 1985

[30] Foreign Application Priority Data

Apr. 16, 1984 [JP] Japan .................................. 59-76115

[51] Int. Cl.$^4$ .............................................. G03B 3/10
[52] U.S. Cl. .................... 354/402; 354/195.1
[58] Field of Search ............................... 354/400–409, 354/195.1

[56] References Cited

U.S. PATENT DOCUMENTS

| 3,972,056 | 7/1976 | Tsujimoto et al. ................. 354/402 |
| 4,002,405 | 1/1977 | Stahl ............................. 354/195.1 X |
| 4,083,057 | 4/1978 | Quinn ................................... 354/402 |
| 4,473,743 | 9/1984 | Ishikawa ........................ 354/402 X |

FOREIGN PATENT DOCUMENTS

| 194005 | 11/1983 | Japan ................................... 354/402 |
| 205135 | 11/1983 | Japan ................................... 354/402 |
| 61806 | 4/1984 | Japan ................................... 354/400 |

Primary Examiner—William B. Perkey
Attorney, Agent, or Firm—Toren, McGeady, Stanger, Goldberg & Kiel

[57] ABSTRACT

What the present invention discloses is that in such a lens system that the degree of focus of an object image on the focal plane is decreased by zooming, when the decrease in the degree of focus of the object image by zooming is large, the zooming operation, or the speed of variation of the focal length is made slower.

2 Claims, 4 Drawing Figures

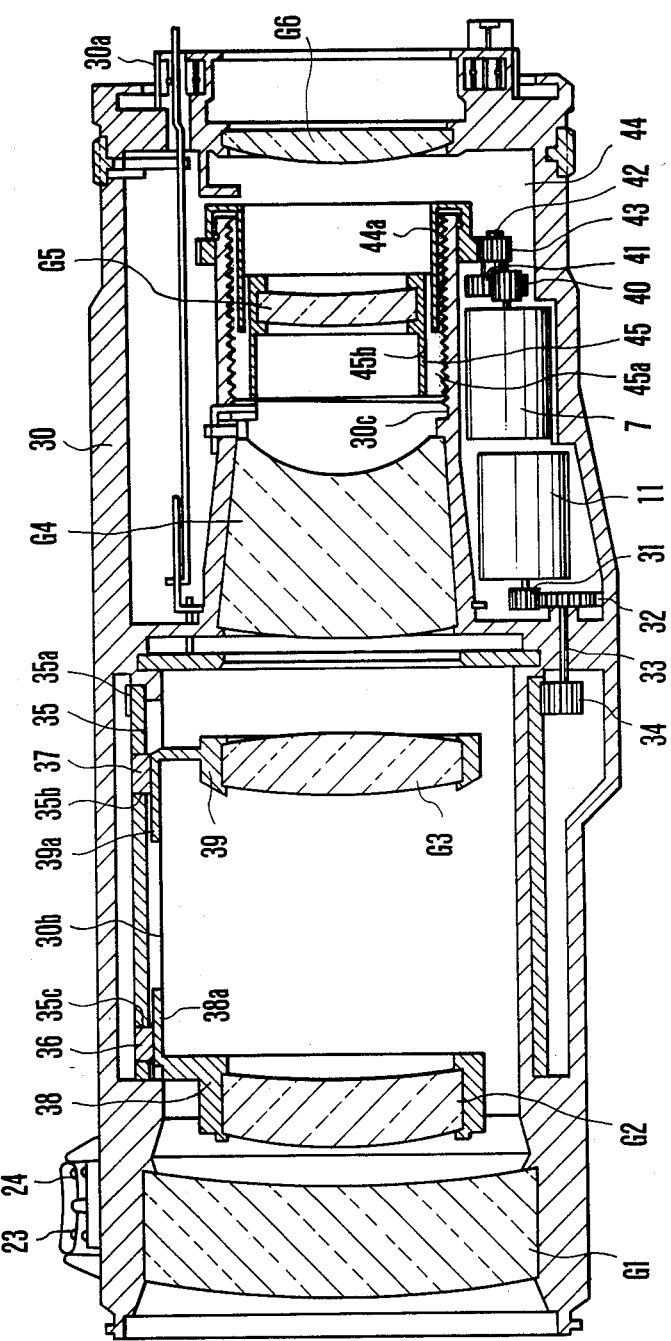

AUTOMATIC FOCUSING DEVICE

BACKGROUND OF THE INVENTION

1. Field of the Invention

This invention relates to an automatic focusing device for the lens system having lenses of the zooming function.

2. Description of the Prior Art

From the past, as the zoom lens of such type there has been known, for example, the rear focus type. Also in the zoom lenses of such type, when the focal length is changed by zooming, the sharpness of an image for the same object formed by this lens is caused to change. In the camera or the like, therefore, the image on the film plane is blurred. To avoid this, the position of the focusing member is corrected by an automatic focusing device of the TTL type to bring the image into focus, as has already been known, for example, in U.S. Pat. No. 3,972,056.

Here, about the property of such type zoom lens is explained, taking an example of the zoom lens of the rear focus type, by reference to FIG. 1. FIG. 1 shows the relationship between the preset focal length and the required distance the focusing lens moves from the position for infinity with the parameter in the object distance, wherein the ordinate is in the focal length of the entire system and the abscissa is in the movement of the focusing lens. As is obvious from this or first figure, in such type zoom lens, with object at infinity, the in-focus position of the focusing lens remains constant for both of the wide angle and telephoto ends of a zooming range. But as the object distance decreases, the in-focus position of the focusing lens for the telephoto end becomes different from that for the wide angle side. These characteristics depend on the smoothly varying curves of second degree. Also, conversely it will be understood from this graph of FIG. 1 that if the focusing lens is left stationary, the image plane is deviated by zooming. The above-cited example of the prior art is based on the idea that the deviation of the image plane is detected by using an automatic focusing device, and the focusing lens is automatically driven to obtain always a sharp image on the film plane.

By the way, with the use of the commonly available automatic focusing device, as the image on the film plane in the camera blurs largely, when it becomes impossible to determine which direction the focusing lens must move to for the image is brought into focus, the focusing lens is let wander before the in-focus position is reached, or the operating mechanism for the focusing lens is stopped from further driving it. The above-described prior art system has, therefore, the following drawback. When it happens that the zooming operation is carried out at so fast a speed that the image becomes very unsharp, it will take a long time to establish the in-focus condition of the focusing lens, and a good shutter chance will be missed.

SUMMARY OF THE INVENTION

A first object of the present invention is to provide an automatic focusing device for a lens optical system of which the plane of sharp object image varies in position with zooming, wherein the variation of the position of the image plane with zooming is detected to alter the zooming speed so that a rapid focusing adjustment can be made.

Another object of the present invention is to provide an automatic focusing device by which a focusing lens is driven to move on the basis of a signal from focus detecting means for detecting a condition of focus adjustment by the focusing lens and which is also provided with means for electrically driving zoom lenses at the same time when the focusing lens moves, and a control system responsive to that output of the focus detecting means which represents a large deviation of the image plane for changing the driving speed of the electrical motor means.

BRIEF DESCRIPTION OF THE DRAWINGS

FIG. 4 is a longitudinal section view of a mounting for the zoom lens of the rear focus type to which the invention is applied.

DETAILED DESCRIPTION OF THE PREFERRED EMBODIMENT

The present invention will next be described in connection with an embodiment thereof by reference to the drawings.

Figure 1:
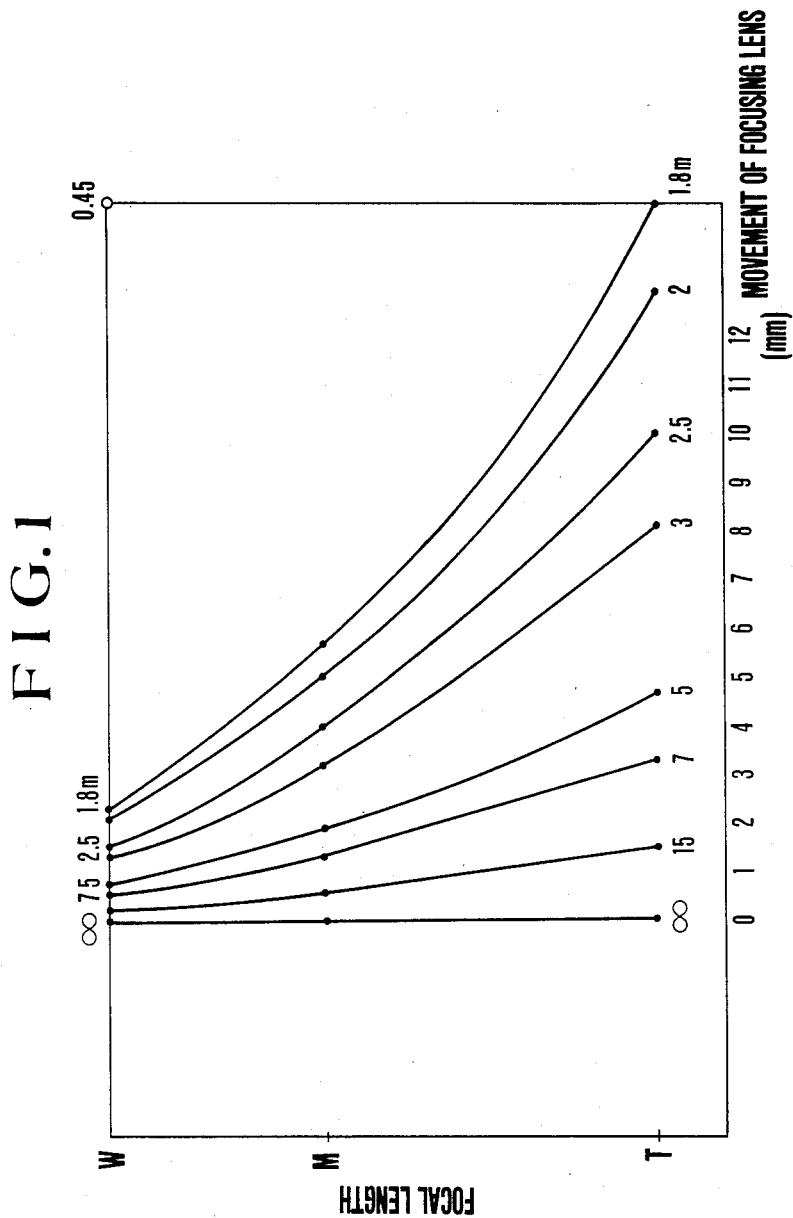
FIG. 1 is characteristic curves showing the relationship between the focal length and the position of the focusing lens in the zoom lens of the rear focus type.
Figure 2:
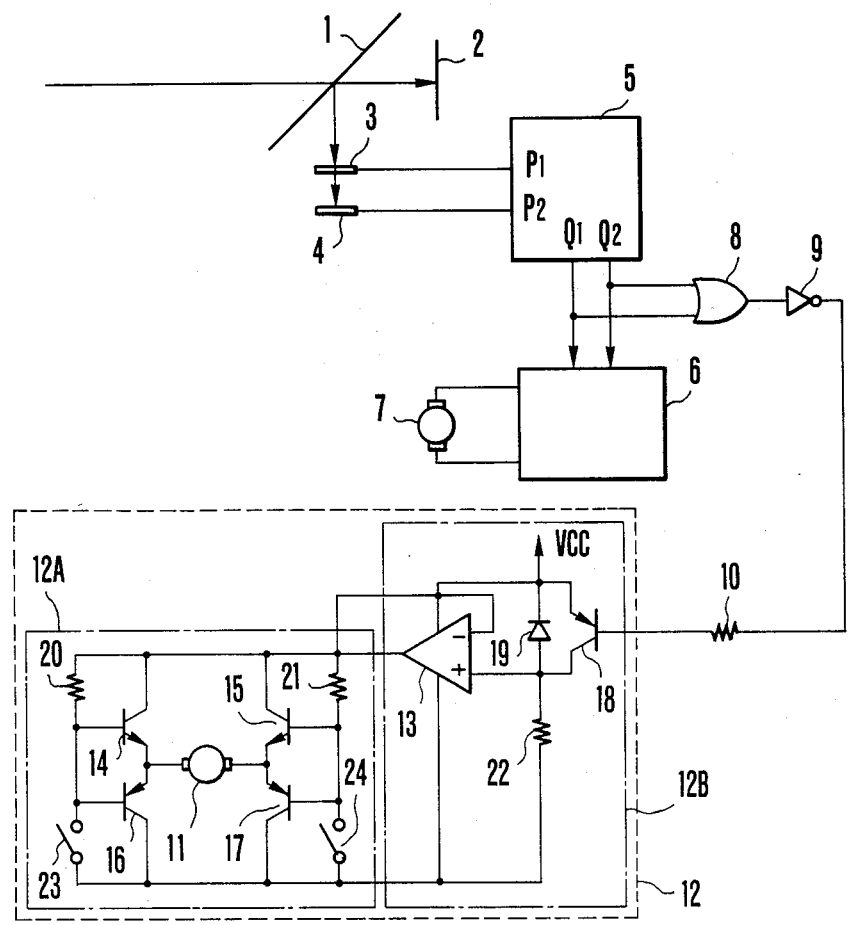
FIG. 2 is an electrical circuit diagram of an embodiment of an automatic focusing device according to the present invention.
Figure 3:
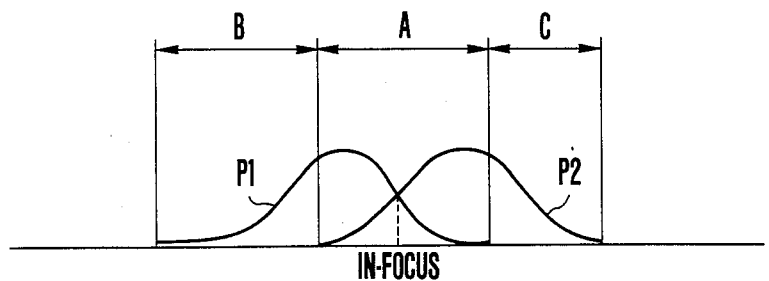
FIG. 3 is a graph of the outputs of the two sensors of the range finder of FIG. 2.

FIG. 2 shows an embodiment of the present invention applied to the range finding and driving system of the single lens reflex camera. In this diagram of FIG. 2, 1 is a known quick return mirror; 2 is a film; and 3 and 4 are range finding sensors positioned respectively on the front and rear side of a conjugate plane to the film 2. From the range finding sensors 3 and 4 are produced outputs P1 and P2 as shown in FIG. 3 to a range finding circuit 5, depending on the degree of sharpness of the image on the film plane 2. The range finding circuit 5 is receptive of these outputs P1 and P2 and responsive to detection of the image in near-focus for producing an output Q1 of high level and another output Q2 of low level. When the image is detected as in far-focus, the output Q1 is changed to low level, and the output Q2 to high level. When in focus, the outputs Q1 and Q2 are both high level. When it is impossible to determine the degree of focus, the outputs Q1 and Q2 become low level, causing a focusing lens drive circuit 6 to drive an electric motor 7 for focusing. The outputs Q1 and Q2 of the range finding circuit 5 are also connected to a control circuit 12 for driving an electric motor 11 for zooming through gate means comprising an OR gate 8, an interver 9 and a resistor 10.

This control circuit 12 comprises a drive circuit 12A for the motor 11 for driving motion of zooming lenses and speed changeover means 12B for producing a signal for changing over the speed of rotation of said motor 11.

The drive circuit 12A is constructed with NPN transistors 14 and 15 and PNP transistors 16 and 17 for controlling the current supply to a winding (not shown) of the motor 11 along with resistors 20 and 21. Switches 23 and 24 are connected respectively in the base-collector paths of the transistors 16 and 17 to change over the zooming direction. These switches 23 and 24 are arranged as shown in FIG. 4.

The speed changeover means 12B is constructed with an operational amplifier 13, a PNP transistor 18, a Zener diode 19 and a resistor 22.

FIG. 3 illustrates the variation of the outputs P1 and P2 of the range finding sensors 3 and 4 with the distance the focusing lens moves. Within a region A, the image is either sharp, or not so unsharp that the blurring amount can be discriminated. In either of regions B and C, however, the image is so unsharp that the degree of focus no longer can be measured.

In the region A shown in FIG. 3, the output of the OR gate 8 is high level and the output of the inverter 9 is low level, rendering the transistor 18 conducting. The voltage across the resistor 22, therefore, becomes high, and the output of the operational amplifier 13 also takes high potential. Then, when the zooming switch 23 or 24 is turned on, either the pair of transistors 15 and 16, or the pair of transistors 14 and 17 become conducting to energize the zoom motor 11. Thus, it is in this region A that the motor 11 rotates at a high speed. It is to be noted that the direction of current flowing to the zoom motor 11 changes over between when the switch 23 is on with the switch 24 off, and when the switch 24 is on with the switch 23 off. Therefore, the zoom motor 11 rotates in the normal or reverse direction depending on the closed position of the switches 23 and 24, and changes the focal length of the zoom lens to either one of the telephoto and wide angle ends.

On the other hand, when the object lies outside the distance measurable range, that is, in such range as shown by B or C of FIG. 3, the output of the OR gate 8 becomes low level, and the output of the inverter 9 becomes high level, thereby the transistor 18 is turned off and the output of the operational amplifier 13 is changed to low level. For this reason, as the zooming switch 23 or 24 is closed, the zoom motor 11 rotates at a slow speed. Therefore, the focal length of the zoom lens is made to vary slowly. The slowing of the zooming speed allows for the range finding circuit 5 to become able to recognize which direction gives a shorter distance to the in-focus position. When it enters the region A where the degree of sharpness of the image can be measured, the zooming speed is increased again. Such procedure is repeated each time the image is taken largely out of focus.

FIG. 4 in longitudinal section view illustrates the zoom lens of the rear focus type embodying the device of the invention. For note, the same reference characters as those of FIG. 2 represent the similar parts. 30 is a body tube having a mount 30a and containing fixed lenses G1, G4 and G6. The zoom lens drive electric motor 11 and the second electric motor 7 for focusing are also mounted in the body tube 30. A pinion 31 on the output shaft of the motor 11 meshes with a speed reduction gear 32. A second pinion 34 is mounted on a common shaft 33 of the gear 32, and meshes with a geared portion 35a of a zoom cam sleeve 35. The cam sleeve 35 is provided with camming slots 35b and 35c into which a roller 36 for variator and another roller 37 for compensator extend respectively.

G2 is a lens component as the variator held in a cell 38. A key 38a formed in a portion of the cell 38 fits in an axially elongated slot 30b provided in the body tube 30. Another lens component G3 as the compensator is held in a cell 39. A key 39a of the cell 39 fits in the slot 30b. The zoom component drive system of such construction operates as follows: When either one of the zooming switches 23 and 24 is turned on, the motor 11 rotates. Motion of the motor 11 is transmitted through the gear system 31, 32, 33, 34, 35a to turn the cam sleeve 35, thereby the zoom components G2 and G3 are moved in differential relation to vary the focal length of the zoom lens.

In a focusing adjustment drive system, on the other hand, a pinion 40 on the output shaft of the motor 7 meshes with a speed reduction gear 41. A small gear 43 on a common shaft 42 of the gear 41 meshes with a rotatable member 44. A fork 44a extends from this rotatable member 44 into an axially elongated key groove 45a of a moving sleeve 45. Formed in the outer periphery of the moving sleeve 45 is a male helicoid screw thread 45b meshing with a female helicoid screw thread 30c formed in the inner surface of the body tube 30.

The focusing lens drive system of such construction drives motion of the motor 7 depending on the object distance. This driving torque rotates the gear system 40, 41, 42, 43 and further is transmitted through the fork 44a of rotatable 44 to rotate the moving sleeve 45. By the rotation of the moving sleeve 45, the focusing lens component G5 while rotating is axially moved forward or backward. By this operation, a proper focus is given to the camera.

As has been described above, according to the present invention, the automatic focusing device has, despite the plane of sharp image is displaced by zooming as the zoom switch is operated, to re-establish the in-focus condition more quickly and more reliably than was heretofore possible, because the zooming speed can be increased when the displacement is short, and because it is slowed down when the displacement is long. This produces an advantage of enabling the motorized zoom lens of the rear focus type to always obtain pictures of sharp focus.

What is claimed is:

1. An automatic focusing device comprising:
  (a) a lens optical system having a focusing function and a zooming fuction;
  (b) an electric motor for moving said lens optical system to effect zooming;
  (c) control means for controlling rotation of said motor selectively to high speed rotation and low speed rotation;
  (d) focus detecting means for detecting the focusing condition of an object image formed by said lens optical system; and
  (e) gate means receptive of a signal of said focus detecting means for detecting a signal for the motor high speed rotation by said control means.

2. An automatic focusing device comprising:
  (a) a lens optical system having a focusing lens and a zoom lens;
  (b) first drive means for driving motion of said focusing lens;
  (c) second drive means for driving motion of said zoom lens, said means being able to change over the driving speed of said zoom lens in a plurality of stages;
  (d) focus detecting means for detecting the focusing condition of an object image formed by said focusing lens;
  (e) a focusing lens drive circuit receptive of a signal from said focus detecting means for controlling said first drive means; and
  (f) means receptive of a signal from said focus detecting means for detecting a selection signal for the driving speed of said second driving means.

* * * * *